No. 715,078. Patented Dec. 2, 1902.
H. F. JEFFS.
CHANGEABLE SPEED GEAR.
(Application filed May 27, 1902.)
(No Model.)
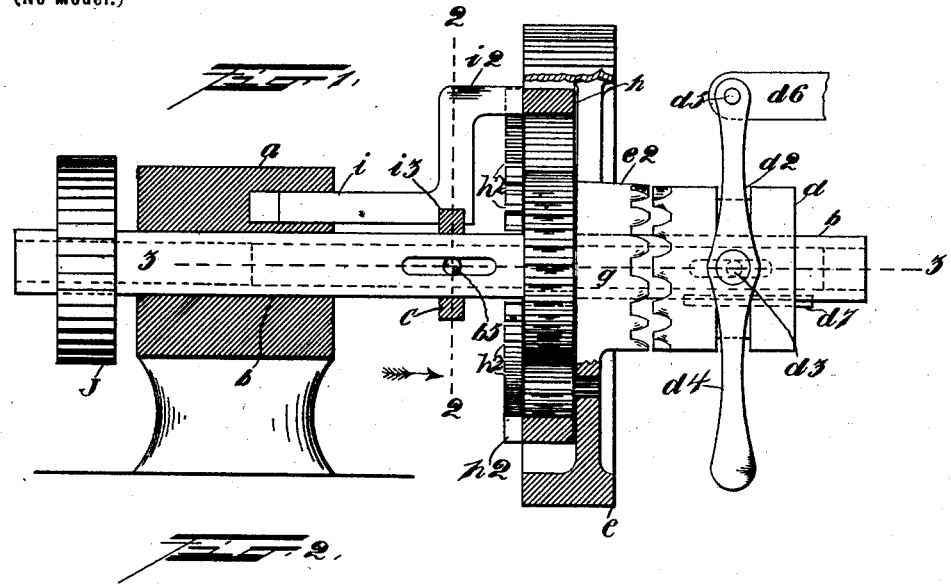
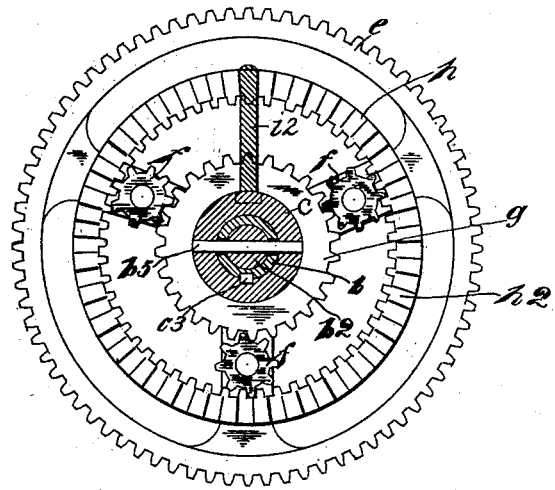
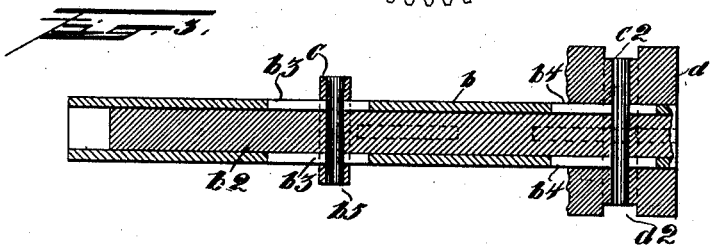
WITNESSES
INVENTOR
Henry F. Jeffs
BY
Edgar Tate & Co.
ATTORNEYS

United States Patent Office.

HENRY F. JEFFS, OF BROOKLYN, NEW YORK.

CHANGEABLE-SPEED GEAR.

SPECIFICATION forming part of Letters Patent No. 715,078, dated December 2, 1902.

Application filed May 27, 1902. Serial No. 109,136. (No model.)

*To all whom it may concern:*

Be it known that I, HENRY F. JEFFS, a citizen of the United States, residing at Brooklyn, in the county of Kings and State of New York, have invented certain new and useful Improvements in Changeable-Speed Gear, of which the following is a full and complete specification, such as will enable those skilled in the art to which it appertains to make and use the same.

The object of this invention is to provide an improved changeable-speed gear for use in connection with a lathe power-shaft or in any other and similar relation and which may also be employed in connection with the operating mechanism of motor-vehicles; and with this and other objects in view the invention consists in a changeable-speed gear constructed as hereinafter described and claimed.

The invention is fully disclosed in the following specification, of which the accompanying drawings form a part, in which the separate parts of my improvement are designated by the same reference characters in each of the views, and in which—

Figure 1 is a sectional side elevation of an ordinary lathe-shaft provided with my improved changeable-speed gear; Fig. 2, a section on the line 2 2 of Fig. 1, and Fig. 3 a partial section on the line 3 3 of Fig. 1.

In the drawings forming part of this specification I have shown at $a$ a suitable support, in which is mounted a longitudinal shaft $b$, and this shaft is tubular in form and provided with a supplemental shaft $b^2$, which is mounted therein and movable longitudinally thereof, and the shaft $b$ is provided in the opposite side thereof at $b^3$ with longitudinal slots and at $b^4$ with similar longitudinal slots, and through the slots $b^3$ and through the supplemental shaft $b^2$ is passed a pin $b^5$, which also passes through a collar $c$, which is mounted on the shaft $b$ and movable longitudinally thereof. A pin $c^2$ is passed through the slots $b^4$ in the shaft $b$, through the supplemental shaft $b^2$, and through a clutch-head $d$, which is also mounted on the shaft $b$ and movable longitudinally thereof. The clutch-head $d$ is provided with an annular groove $d^2$, through which the pin passes, and connected with said clutch-head in the usual manner at $d^3$ is an operating-lever $d^4$, which is pivotally connected at $d^5$ with a suitable support $d^6$, and by means of the lever $d^4$ the clutch-head $d$ may be movable longitudinally on said shaft, and the collar $c$ is provided with a corresponding spline $c^3$, which prevents said collar from turning on said shaft, but permits it to move longitudinally thereof.

Mounted on the shaft $b$ is a power-wheel $e$, which is shown on the drawings as an ordinary gear-wheel, but which may be a belt-wheel, and this power-wheel $e$ is provided on the side thereof adjacent the clutch-head $d$ with a corresponding clutch $e^2$, and said power-wheel $e$ is provided on its opposite side with a plurality of pinions $f$, which, as shown in the drawings, are three in number, and mounted on the shaft $b$ and operating in connection with the pinions $f$ and secured to the said shaft is a gear-wheel $g$, and inclosing the pinions $f$ is a loose internal gear $h$, which is also provided on its outer face with clutch-teeth $h^2$.

Movable in the support $a$ is an arm $i$, which is provided with an annular member $i^2$, adapted to engage the clutch-teeth $h^2$ of the internal gear $h$, and the arm $i$ is provided with a recess $i^3$, adapted to receive the collar $c$, and in which said collar is free to turn.

In this construction the power is applied to the shaft $b$, which is provided with a pulley $j$ for this purpose, and when it is desired to turn the power-wheel $e$ at the same speed as the shaft $b$ the clutch-head $d$ is forced inwardly by means of the lever $d^4$, so that it engages with the corresponding clutch-head $e^2$ on the wheel $e$, and in this operation the supplemental shaft $b^2$ is moved by the lever $d^4$, and the arm $i$ or the annular member $i^2$ thereof is disconnected from the clutch-teeth $h^2$ of the loose internal gear $h$, and the wheel $e$ is revolved with the shaft $b$. If it is desired to turn the wheel $e$ slower than said shaft $b$, the clutch $d$ is moved to the right, or into the position shown in Fig. 1, and this operation, through the agency of the supplemental shaft $b^2$, draws the arm $i$ to the right and causes the annular member $i^2$ thereof to engage the gear-wheel $h$, which also serves as a clutch-wheel, and the wheel $e$ is turned at a rate of speed less than that of the shaft $b$.

This mechanism is simple in construction and operation and perfectly adapted to accomplish the results for which it is intended, and it will be apparent that the shaft *b* may be provided with any desired number of supports, and said shaft may be turned at any speed required.

Having fully described my invention, what I claim as new, and desire to secure by Letters Patent, is—

1. In a changeable-speed gear, a revoluble, tubular shaft, a supplemental shaft mounted therein and movable longitudinally thereof, a clutch-head mounted on said tubular shaft and adapted to slide thereon and in connection with the supplemental shaft, a power-transmitting wheel mounted on said tubular shaft and provided with a clutch-head adapted to operate in connection with the first-named clutch-head, pinions connected with said wheel, a gear-wheel secured to said tubular shaft and operating in connection with said pinions, an internal gear inclosing said pinions and provided on its outer face with clutch-teeth, a clutch-arm movable longitudinally of said tubular shaft, and adapted to engage said clutch-teeth, and a collar mounted on said tubular shaft and connected with said supplemental shaft and adapted to operate said arm, substantially as shown and described.

2. In a changeable-speed gear, a tubular power-shaft, a supplemental shaft mounted therein and adapted to move longitudinally thereof, a power-transmitting wheel mounted on said tubular shaft and provided at one side with a clutch-head, a clutch-head mounted on said tubular shaft and movable longitudinally thereof and connected with said supplemental shaft and adapted to operate in connection with the clutch-head of the power-transmitting wheel, pinions connected with said power-transmitting wheel, a gear-wheel secured to said tubular shaft and operating in connection with said pinions, an internal gear inclosing said pinions and provided on its outer face with clutch-teeth, a clutch-arm movable longitudinally of said tubular shaft and adapted to engage said clutch-teeth and a collar on the tubular shaft and in connection with the supplemental shaft and adapted to operate said arm, substantially as shown and described.

3. In a changeable-speed gear, a main power-shaft, a supplemental shaft, a power-transmitting wheel mounted on the main shaft, pinions connected with the power-transmitting wheel, a gear-wheel secured to the said power-shaft and operating in connection with said pinions, an internal gear inclosing said pinions and provided with clutch devices, a clutch-arm movable longitudinally of said power-shaft adapted to engage said clutch devices and means for operating said arm, substantially as shown and described.

4. In a changeable-speed gear, a revoluble tubular shaft, a supplemental shaft mounted therein and movable longitudinally thereof, a clutch-head mounted on said tubular shaft and adapted to slide thereon and in connection with the supplemental shaft, a power-transmitting wheel mounted on said tubular shaft and provided with a clutch-head adapted to operate in connection with the first-named clutch-head, pinions connected with said power-transmitting wheel, a gear-wheel secured to said tubular shaft and operating in connection with said pinions, an internal gear inclosing said pinions and provided on its outer face with clutch devices, a clutch-arm movable longitudinally of said tubular shaft, and adapted to engage said clutch devices, and a collar mounted on the tubular shaft and connected with said supplemental shaft and adapted to operate said arm, substantially as shown and described.

In testimony that I claim the foregoing as my invention I have signed my name, in presence of the subscribing witnesses, this 24th day of May, 1902.

HENRY F. JEFFS.

Witnesses:
   F. A. STEWART,
   C. E. MULREANY.